March 7, 1950 R. A. KEMPF 2,499,759
LOCATION OF FAULTS IN ELECTRICAL TRANSMISSION SYSTEMS
Filed July 31, 1947
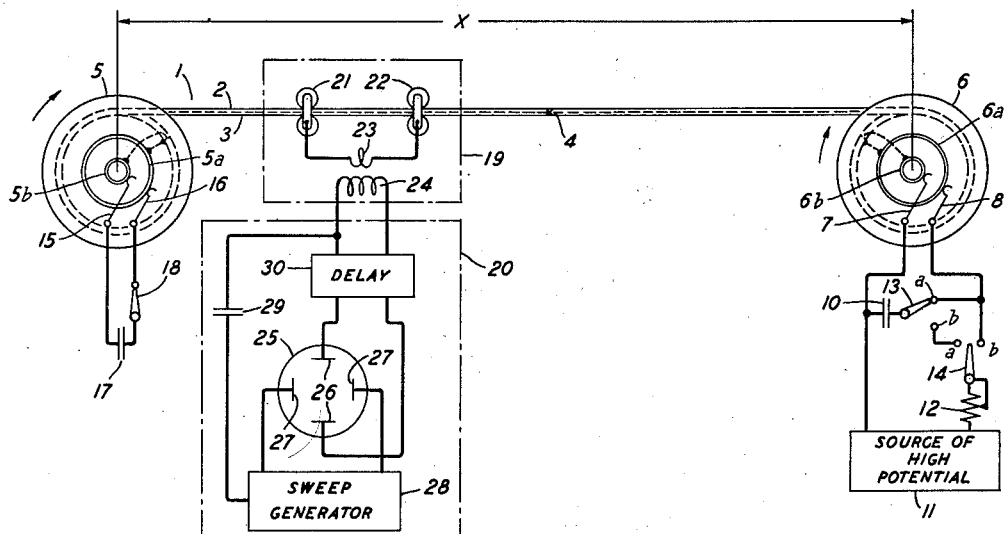
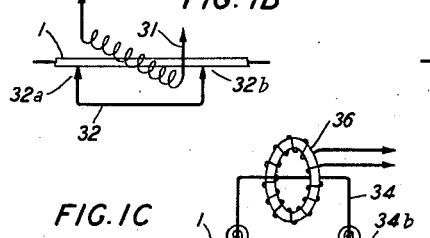
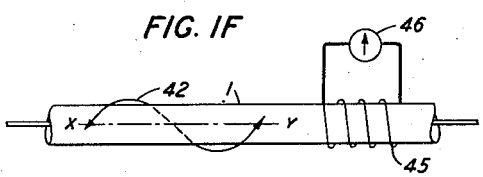
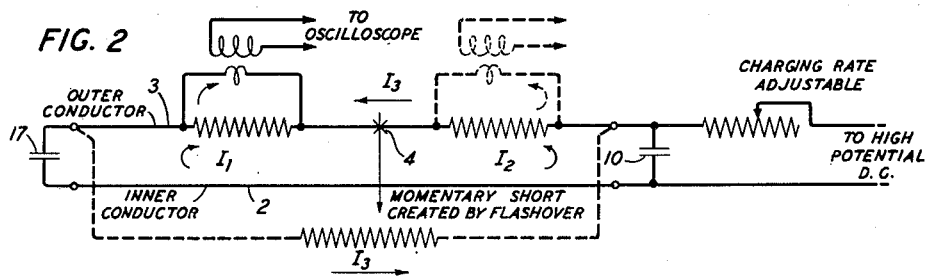
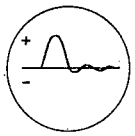
ONE SIDE OF FAULT
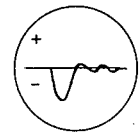
OPPOSITE SIDE OF FAULT
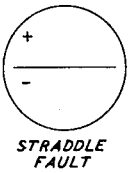
STRADDLE FAULT
INVENTOR
R.A. KEMPF
BY
N. S. Ewing
ATTORNEY Patented Mar. 7, 1950

2,499,759

UNITED STATES PATENT OFFICE 2,499,759

LOCATION OF FAULTS IN ELECTRICAL TRANSMISSION SYSTEMS

Raymond A. Kempf, Baltimore, Md., assignor to Bell Telephone Laboratories, Incorporated, New York, N. Y., a corporation of New York Application July 31, 1947, Serial No. 765,087

6 Claims. (Cl. 175—183)

This relates in general to the location of faults in an electrical transmission system. More particularly, it relates to the location of high-voltage faults in electrical transmission lines.

In certain types of coaxial cable systems, breakdown at high voltage is frequently caused by the presence of mechanical defects or metallic inclusions which may not be located by the usual prior art methods. Moreover, in accordance with certain other prior art systems, the faulty point is located only in terms of length ratios whereby the region, but not the exact point of fault, is known. If the length is not precisely known, the cable system must be opened over a considerable distance for visual inspection and listening tests, which procedure is time consuming, particularly from the standpoint that manual rebuilding of the inspected section frequently causes mechanical and electrical degradation of the cable system.

It is therefore the primary object of this invention to provide techniques and apparatus for locating the precise physical points of high-voltage faults in electrical transmission systems.

A particular feature of the present invention is its adaptability for the large-scale factory inspection of certain types of cable for high-voltage faults. The invention is particularly useful for the location of high-voltage faults in disk-insulated longitudinal seam coaxial cable, whether in single or twisted multiple strands, and also in other types of cable circuits such as lightning-protected cable having a sheath-to-corrugated-copper path.

In accordance with the present invention, the test cable is fed from one to another of a pair of reels, condensers being slidably connected between the central conductor and sheath through slip rings at each end of the test interval. A high enough direct-current voltage is applied to one end of the circuit to produce an electromagnetic disturbance which may take the form of a flash-over at the fault. The intermittent discharges of one or both condensers through a flash-over point at the fault produce I. R. drops along the sheath which can be measured and phase-compared in an indicator, such as a cathode-ray oscilloscope, which is electrically coupled to the cable through a rolling or sliding pick-up device. The exact location of a fault can then be effected by a determination of the point at which phase reversal occurs on the indicator as a current detecting means or, what is more commonly known in the engineering vernacular as a "pick-up device" is moved over the test interval. Several alternative forms of pick-up and indicating circuits are disclosed.

The invention will be better understood and other objects and features thereof will be apparent from a study of the drawings and the detailed description set forth hereinafter.

In the drawings:

Fig. 1A shows a high-voltage fault locating system in accordance with the present invention mounted for examination of cable passing between two reels;

Figs. 1 (B-E) show modified forms and positions of the pick-up device 19 of Fig. 1A;

Fig. 1F shows a further modification of the system of Fig. 1A in which a galvanometer is substituted for the cathode-ray tube indicator 25;

Fig. 2 is a schematic diagram of the equivalent electrical circuit indicating the principle of operation of the system of Fig. 1A; and Figs. 3 (A), 3 (B) and 3 (C) show various types of figures which appear as the screen of the cathode-ray tube indicator 25 during operation of the system of Fig. 1A.

Referring to Fig. 1A of the drawings, one of the preferred embodiments of the invention will now be described in detail.

The test cable 1 may be a longitudinal seam coaxial cable of the type and size conventionally used for telephone communication, comprising a cylindrical outer conductor 2 and an inner axial conductor 3 which are maintained at a uniform separation by means of thin disks of dielectric material such as hard rubber or polyethylene disposed at regular intervals along the interior of the cable. The dielectric medium is thus almost wholly gaseous.

Assume the presence in the test cable 1 of one or more mechanical defects or metallic inclusions 4 which tends to increase the potential gradient between the outer conductor 2 and the inner conductor 3 at that particular point, making it more susceptible to high-voltage breakdown.

The cable 1 is mounted on a pair of reels 5 and 6 which are spaced apart by a convenient distance X, a few yards long. The reels 5 and 6 are so disposed as to be rotatable in a clockwise direction, whereby the cable 1 may be progressively fed at any desired rate from the reel 5 to the reel 6, moving from left to right across the space interval X.

One terminal of the sheath 2 of the test cable section 1 is connected to the slip ring 5a of the reel 5, and the other terminal of the sheath 2 is connected to the slip ring 6a of the reel 6. Likewise, the terminals of the inner cable conductor 3 are respectively connected to the slip rings 5b and 6b of the reels 5 and 6.

A source of direct current potential 11 which may comprise, for example, a kenatron tube or other high voltage source, is adapted to be connected between the inner conductor 3 and the sheath 2 of the cable 1 at the right-hand reel 6. The connecting circuit includes the sliding contacts 7 and 8 riding on the slip rings 6b and 6a thereby respectively making contact with the inner conducting cable 3 and the cable sheath 2; the condenser 10, the regulating resistance 12, and the interconnecting switches 13 and 14.

Switches 13 and 14 are so adapted that the source 11 in parallel with the condenser 10 is connected between the inner and outer cable conductors 3 and 2 when switch 13 is positioned on contact 13a and the switch 14 is positioned on the contact 14b.

Alternatively, the source 11 is adapted to be independently connected to charge up the condenser 10 when the switch 14 is in position 14a and the switch 13 is in position 13b. In accordance with a third arrangement the switch 13 may be positioned so that the condenser 10 is disconnected from the circuit and the source 11 is connected directly between the sheath 2 and the inner conductor 3 of the cable 1 through the contact 14b of the switch 14.

At the left-hand reel 5, a condenser 17 is provided for connection between contacts 15 and 16, and hence between the sheath 2 and the inner conductor 3 of the cable 1. The switch 18 provides for alternatively connecting condenser 17 in and out of the circuit.

The cable 1 is threaded through a pick-up device 19 which is coupled to a detecting device 20. The pick-up device 19 comprises an inductive strap 23 mounted on the rolling contactors 21 and 22 which are adapted to move over the surface of the cable sheath and make electrical contact therewith.

The detecting device 20 may comprise a cathode-ray oscilloscope having a high-persistance screen and provided with vertical deflecting plates 26 and horizontal deflecting plates 27. The vertical deflecting plates 26 are connected through the delay circuit 30 to the coil 24 which is inductively coupled to the contacting strap 23.

The horizontal deflecting plates 27 are connected across the output of the sweep generator 28, which is a conventional type of saw-tooth voltage generator well known in the art. The sweep generator 28 is triggered to synchronize its operation with recurrence of fault-generated vibrations by connection to the cable output through a circuit which includes the condenser 29 in series with the inductive coupling coil 24.

Assume the system of Fig. 1 is to be operated for the purpose of examining a length of cable 1 for high voltage defects of the type described.

The cable 1 is mounted on the reels 5 and 6 in the manner described so that upon rotation of the reels 5 and 6 in a clockwise direction the cable is progressively threaded through the rolling contactors 21 and 22. In the circuit associated with the right-hand reel 5 the switch 14 is positioned on contact 14b; and the switch 13 is positioned on contact 13a, thereby connecting the potential source 11 and the condenser 10 in parallel between the central conductor 3 and the outer conducting sheath 2. In the circuit associated with the left-hand reel 6, the switch 18 is closed, connecting the condenser 17 between the central conductor 3 and the sheath 2.

Assume the presence in the test interval X of a mechanical defect or metallic inclusion 4 which tends to increase the potential gradient between the outer and inner conductors at a particular point, making it more susceptible to high voltage breakdown. If the potential of the source 11 is adjusted to a sufficiently high value, a voltage breakdown occurs at the fault 4 which takes the form of a series of periodic arc discharges between the inner and outer conductors, whose rate is dependent on the constants of the R. C. circuit comprising the cable conductors 2 and 3, the condensers 10 and 17, and the rheostat 12, which may be adjusted to secure the desired timing. The aforesaid discharges initiate trains of waves which travel along the cable conductors in both directions from the fault 4.

When discharge takes place, the condition shown in the equivalent circuit of Fig. 2 will obtain. Condensers 10 and 17 periodically discharge through the flash-over or breakdown at 4 each time it occurs, and each develops a measurable IR drop along the outer conductor of the unit, where I is the current in the coaxial conductors and R is the surface transfer impedance of the outer conductor. Inasmuch as the condensers discharge from opposite ends of the unit, the individual IR drops developed are in series opposition, with the fault forming the junction of common polarity.

It has been observed experimentally that it is important to keep the impedance of the exterior circuit between the ends of the coaxial cable 1 relatively high as compared to the impedance of the strap 23. This external circuit is shown on the equivalent circuit of Fig. 2 by the dashed line. The current $I_3$ in the external circuit is set up whenever there exists an inequality in voltage drops along the outer conductors, as a result of the position of the point of breakdown relative to the reels. The direction of flow of $I_3$ has been found to depend on the position of the fault with respect to the reels; that is, the direction reverses as the fault is re-reeled from one reel to the other. When the fault is between the reels the current $I_3$ flows in proportion to the difference in the two voltages along the outer surface of the outer conductor produced by the currents $I_1$ and $I_2$ acting through the surface transfer impedance of the outer conductor. Thus, $I_3$ reaches a null when the fault is exactly centered between the reels. It has been found experimentally that a pick-up coil or loop placed in the vicinity of the cable appears to pick up a voltage which is induced by the current $I_3$. Obviously, the induced voltage does not change polarity when the coil is moved past the fault, because $I_3$ flows around the circuit including the tertiary impedance indicated by the dashed line on the drawing. It is this fact that explains the need for the low-impedance strap. The strap 23 provides an impedance path much lower than that through the tertiary circuit, and thus the current through the strap will reverse when the fault is passed. The pick-up coil is coupled to the strap as indicated on the drawing.

By rotation of the reels 5 and 6 the test cable 1 is fed from left to right across the interval X so that it progressively threads through the rolling contactors 21 and 22 of the inductive strap 23. Assuming the presence of a fault 4 in the test interval X, the screen of the oscilloscope 25 will show a deflection which changes in polarity as the strap 23 passes the fault, such as shown in Figs. 3A and 3B.

As indicated in Fig. 3C, no deflection will be obtained when the strap is centered over the fault.

This method thus facilitates precise physical location of the fault or point of flash-over at any convenient speed of re-reeling.

In accordance with an alternative form of operation either one or the other of the condensers 10 or 17 may be disconnected from the circuit by open-circuiting their respective switches 13 and 18. In this case, the oscilloscope deflection will be obtained only when the pick-up device 19 is located between the operating condenser and the fault 4.

Short circuits may be located by eliminating the condenser at the far end, and connecting switches 13 and 14 so that the condenser 10 may be alternatively charged and discharged through the cable connection. The resultant discharge may be detected by a deflection appearing on the screen of the oscilloscope 25 when the pick-up device is located between the condenser 10 and the fault 4.

Although it is conceivable that a system in accordance with the present invention might be operated without either of the externally connected condensers 10 and 17 by placing dependence on the charge collected along the distributed capacitance of the cable 1 for generation of detectable currents $I_1$ and $I_2$, these currents would be small in magnitude and high in frequency with consequent difficulties.

Other devices for picking up the IR drop along the outer conductor or the field set up by the discharge current flowing in the conductors may be substituted for the pick-up unit 19 of Fig. 1A, such as shown in Figs. 1B–1F. All of these devices depend upon either the current flow accompanying the breakdown at the fault to set up a magnetic field which may be detected, or upon the potential difference between adjacent sections of the outer conductor to set up detectable current flow in a secondary or tertiary circuit which is attached to the test coaxial cable unit.

The detectable field has been shown to be dependent upon the relative concentricity of the conductors of the coaxials in addition to the shielding properties of the outer conductor. In the case of eccentricity, the resulting external field may over-shadow that normally present in the absence of eccentricity. Since the degree and direction of eccentricity is likely to occur at random along a given coaxial, the signal detected by the pick-up device may vary over wide limits leading to inconclusive or misleading fault location. Use of a strap such as 23 in Fig. 1A eliminates this confusion.

The pick-up device shown in Fig. 1B, which may be substituted for the pick-up unit 19 of Fig. 1A, comprises a conducting strap 32 having contacting probes 32a and 32b which are adapted to be moved along the cable sheath 2. The fault generated signal is picked up inductively through a solenoid 31 having its axis substantially at right angles to the longitudinal axis of the cable 1. The solenoid 31 may be connected to any suitable polarity-sensitive indicator such as the cathode-ray tube indicator 20 of Fig. 1A.

Another alternative form of the pick-up device 19 is shown in Fig. 1C which utilizes a toroid 36 wound on a high permeability core which is threaded through a conducting strap 34 having rolling contactors 34a and 34b which make electrical contact with the cable sheath 2. Instead of the toroid 36 a single loop of wire 38 as shown in Fig. 1(D) may be inductively coupled to a tertiary circuit including the conducting strap 37 and the cable sheath 2.

Another alternative form of the pick-up device 19 is shown in Fig. 1E, in which a capacitive coupling with the cable sheath 2 is substituted for the direct contact coupling between the sheath and conducting strap, such as shown in Figs. 1A–1D. The contactors 40 and 41 comprise shaped metal shoes lined with dielectric material which are adapted to ride over the cable sheath 2 without making direct electrical contact therewith. The contactors 40 and 41 are connected to an indicating device such as the cathode-ray tube indicator 20 described with reference to Fig. 1A above.

Fig. 1F shows a special type of coupling in which the coaxial under test is threaded through a solenoid. The voltage at terminals of the solenoid 45 will be zero unless the coaxial cable 1 is wrapped with helically applied steel tapes 42, as in the case of the standard telephone coaxial, or other conductor applied in direct contact with the copper outer sheath 2. The helical steel tapes or other conductors have current set up in them due to potential differences longitudinally along the coaxial sheath 2. Since the tapes or conductors form an elongated solenoid, they will induce current in another solenoid, such as 45, which has the same or a parallel axis. Under such conditions, the use of the steel or other helical conductors to induce voltage in the pick-up coil is in reality a special case of the use of the strap 23 disclosed in Fig. 1A.

The terminals of the coil 45 are coupled to a polarity-sensitive indicating device, which may take the form of a cathode-ray tube indicator such as 20 described hereinbefore with reference to Fig. 1A, or alternatively, a conventional galvanometer such as 46.

It is apparent that the galvanometer 46 could be substituted for the cathode-ray tube indicator 20 in combination with any of the alternative pick-up devices shown in Figs. 1A–1E. Moreover, it will be apparent to those skilled in the art that within the scope of the invention other equivalent elements and combinations of elements can be used in addition to those disclosed; and the test system is applicable for the testing of other cable units than the type described, such as, for example, stranded cables having two or more coaxials, or lightning-protected cable having corrugated copper sheathing, or flexible coaxial cable having a braided outer conductor. In fact, the system of the present invention is adapted for the location of any core to sheath failure in a cable having a multiplicity of conductors such as, for example, a paper insulated voice frequency or carrier frequency telephone cable.

What is claimed is:

1. The method of locating a high voltage conductor-to-sheath fault in a conductively sheathed cable section which comprises storing electrical charge between said conductor and said sheath of sufficient magnitude to cause repeated voltage breakdown at said fault whereby said stored charge is repeatedly discharged through a circuit including said fault and a portion of said cable section adjacent thereto, and detecting variations in said discharge current in the sheath at different points along said cable section for determining the physical location of said fault.

2. The method of locating a high-voltage conductor-to-sheath fault in a conductively sheathed cable section which comprises repeatedly storing electrical charges between conductor and sheath at both ends of the section of sufficient magnitude to cause repeated voltage breakdown at the fault whereby said stored charges are repeatedly discharged through the fault and the two intervening portions of cable, and detecting the relative phase of the discharge current in the sheath at different points along said cable section to determine the point at which said relative phase reverses.

3. A system for locating faults in a transmission line comprising a plurality of conductors which comprises in combination means for producing periodic capacitance discharges between certain of said conductors at a fault in said line whereby current surges are caused to flow from said fault through a circuit including a section of at least one of said conductors adjacent said fault, a sheath current detecting circuit positioned to move along said conductor in a direction substantially parallel to the direction of current flow therein, and a polarity-sensitive current indicating circuit electrically coupled to said detecting circuit to indicate variations in the magnitude and phase of said current at different points on said conductor.

4. A system for locating faults in a transmission line comprising a plurality of conductors which comprises in combination means for producing periodic capacitance discharges between certain of said conductors at a fault in said line whereby current surges are caused to flow in both directions from said fault along at least one of said conductors, a sheath current detecting circuit positioned to move along said conductor in a direction substantially parallel to the direction of current flow therein, and a polarity-sensitive current indicating circuit electrically coupled to said detecting circuit to indicate variations in the magnitude and phase of said current at different points on said conductor.

5. A system for testing conductively sheathed cable which comprises in combination means to progressively feed lengths of said test cable across a preselected test interval, at least one condenser slidably mounted in circuit relation to said cable at one end of said test interval, a source of direct current potential connected in circuit relation to charge said condenser to a sufficiently high potential to cause arcing at a fault in said cable passing through said interval, a sheath current detecting circuit slidably mounted to move along said cable within said interval, and a polarity-sensitive indicating circuit coupled to said detecting circuit.

6. A system for testing conductively sheathed cable which comprises in combination means to progressively feed lengths of said test cable across a preselected test interval, a pair of condensers each of which is slidably mounted in circuit relation to said cable at a different end of said interval, a source of direct current potential connected in circuit relation to charge said condensers to a sufficiently high potential to cause arcing at a fault in said cable passing through said interval, electrical pick-up means slidably mounted to move along said cable within said interval, and polarity-sensitive electrical indicating means electrically coupled to said pick-up means.

RAYMOND A. KEMPF.

REFERENCES CITED

The following references are of record in the file of this patent:

UNITED STATES PATENTS

| Number | Name | Date |
|---|---|---|
| 1,745,419 | Henneberger | Feb. 4, 1930 |
| 1,886,682 | Hubbard | Nov. 8, 1932 |
| 2,176,757 | Borden | Oct. 17, 1939 |
| 2,199,846 | Borden | May 7, 1940 |
| 2,321,424 | Rohats | June 8, 1943 |
| 2,460,688 | Gambrill et al. | Feb. 1, 1949 |

FOREIGN PATENTS

| Number | Country | Date |
|---|---|---|
| 306,679 | Germany | July 9, 1918 |